Feb. 20, 1945.  E. A. WEISS  2,370,097
MOTOR VEHICLE
Filed Aug. 14, 1943
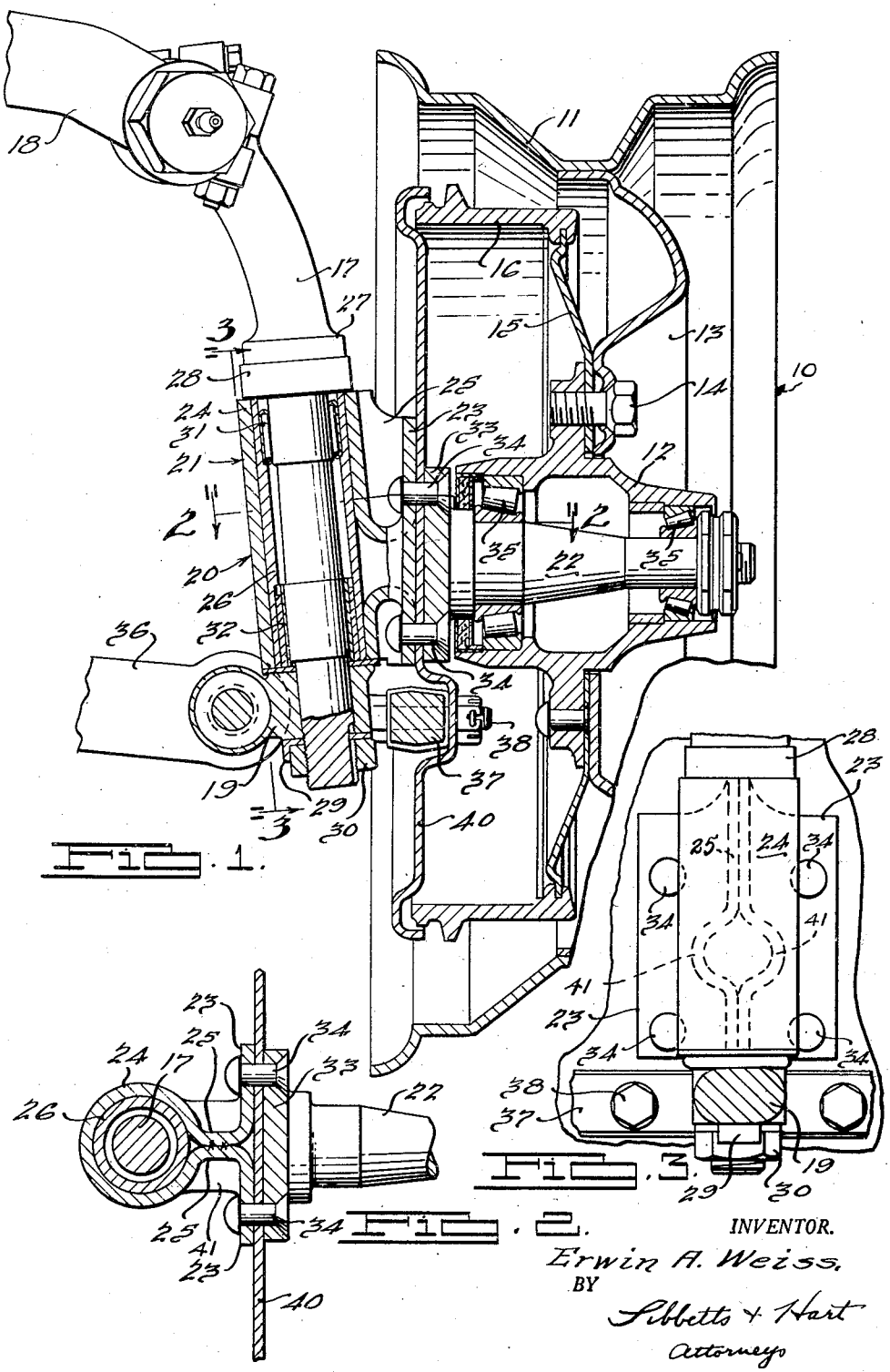
INVENTOR.
Erwin A. Weiss,
BY
Tibbetts + Hart
Attorneys Patented Feb. 20, 1945

2,370,097

UNITED STATES PATENT OFFICE 2,370,097

MOTOR VEHICLE

Erwin A. Weiss, Detroit, Mich., assignor to Packard Motor Car Company, Detroit, Mich., a corporation of Michigan Application August 14, 1943, Serial No. 498,703

2 Claims. (Cl. 280—96.1)

This invention relates to vehicles and more particularly to steering wheel supporting structure.

An object of the invention is to reduce the cost of knuckle structures for steering wheels.

Another object of the invention is to provide a steering knuckle structure for wheels composed of a knuckle portion and a spindle that can be separately fabricated and readily assembled.

Still another object of the invention is to provide a knuckle member for steering wheels that can be stamped from a sheet of metal.

Other objects of the invention will appear from the following description taken in connection with the drawing, which forms a part of this specification, in which:

Fig. 1 is a vertical sectional view of a wheel and its supporting structure incorporating the invention;

Fig. 2 is a sectional view of the wheel supporting structure taken on line 2—2 of Fig. 1;

Fig. 3 is another sectional view of the wheel supporting structure taken on line 3—3 of Fig. 1.

A conventional motor vehicle wheel structure 10 is shown comprising rim 11, hub 12 and disk 13 connecting the rim and hub. The disk can be welded to the rim and secured to the hub by bolts 14, and such bolts can serve to secure the flange 15 of a brake rim 16 to the hub.

The wheel supporting structure comprises a king or swivel pin 17, an upper link 18, a lower link arm 19 and a knuckle structure 20.

The knuckle structure consists of a knuckle member 21 and a wheel carrying spindle 22. The knuckle member is preferably stamped from a sheet of metal to provide aligned end portions 23 forming a spindle supporting wall and a looped swivel portion 24 intermediate the end portions. The neck portions 25 of the sheet metal member between the aligned end portions and the looped portion have upper and lower end portions fastened together by suitable means, such as by welding. The neck portions 41 intermediate the end portions are flared to provide ribs for increasing the strength of the stamping. A sleeve 26 is pressed into the looped portion of the knuckle member.

Swivel pin 17 projects through the sleeve 26 and has a shoulder 27 resting on a thrust bearing 28 seated on the upper end of the looped portion 24 of the knuckle member. A washer 29 is arranged between the lower end of the looped portion of the knuckle member and arm 19 and nut 30 is screwed on the swivel pin to secure the arm and the knuckle member in position on the swivel pin. Roller bearing 31 is arranged between the upper portion of the sleeve and the swivel pin and plain bearing 32 is arranged between the lower part of the sleeve and the swivel pin.

The spindle 22 is formed of bar stock, or as a forging, and has a flanged end 33 that can be secured to the supporting wall of the knuckle member by rivets 34. Prior to securing the spindle, a brake backing or cover plate 40 can be interposed between the supporting wall of the knuckle and the flanged end of the spindle so that the rivets 34 can be utilized to secure it in such relation. Suitable bearings 35 are provided between the spindle and the wheel hub.

The upper end of the swivel pin has the outer end of the supporting link 18 pivoted thereto and arm 19 has the outer end of supporting link 36 pivoted thereto. The inner ends of these links can be pivotally connected to a vehicle frame (not shown).

The wheel is turned for steering by a steering arm 37 that can be fixed to the brake backing plate by bolts 38. This arm can be connected with conventional vehicle steering mechanism (not shown).

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In a steering knuckle structure, a knuckle member stamped from a sheet of metal with the side portions aligned and forming a vertically extending wall, a vertically extending swivel cylinder spaced from the wall and neck portions intermediate the cylinder and the wall and extending partially in abutting relation and welded together, said neck portions having outwardly extending reinforcing ribs along the central portions, a wheel spindle having a flanged end adjacent the wall, and means securing the flanged spindle end and the wall together.

2. In a steering knuckle structure, a knuckle member stamped from a sheet of metal with the side portions aligned and forming a vertically extending wall, a vertically extending swivel cylinder spaced from the wall and portions connecting the wall portions with the cylinder, said connecting portions extending parallel in abutting relation, means securing the abutting connecting portions together, a spindle having a flanged end, and applied means securing the flanged end of the spindle to the side face of the knuckle wall.

ERWIN A. WEISS.